Dec. 4, 1945.  S. BOUSKY  2,390,353
SELF-ALIGNING BEARING ASSEMBLY
Filed May 19, 1944
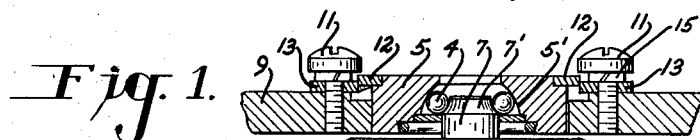
Fig. 1.
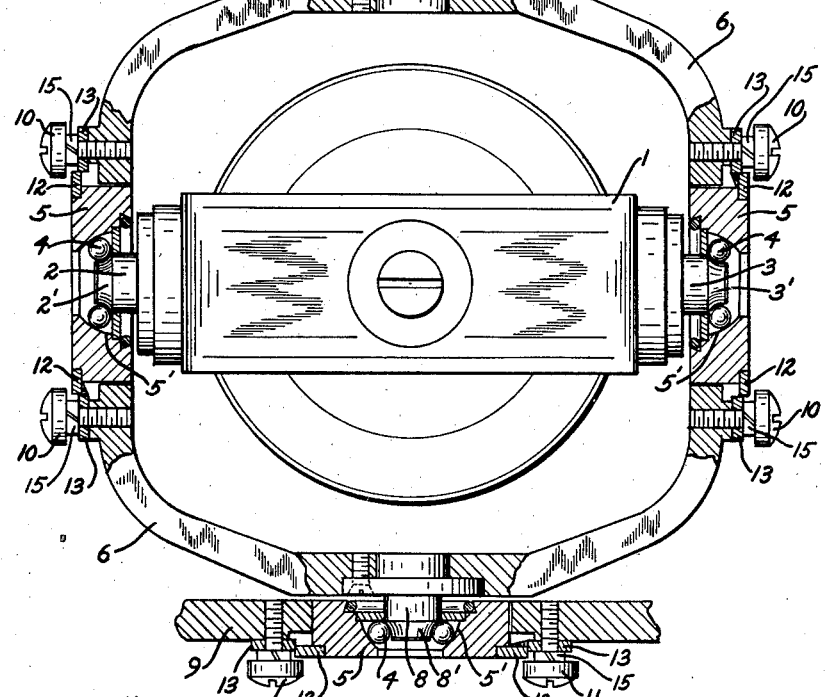
Fig. 2. Fig. 4.
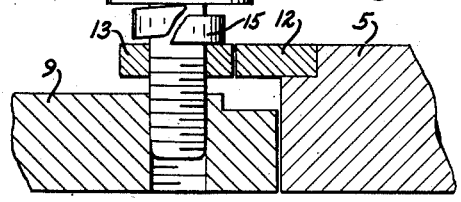
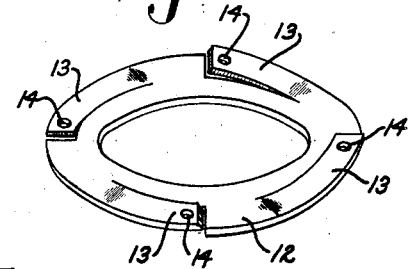
Fig. 3.
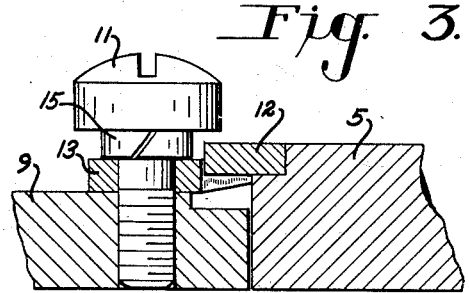
INVENTOR.
SAMUEL BOUSKY
BY
Frank H. Harmon
ATTORNEY Patented Dec. 4, 1945

2,390,353

UNITED STATES PATENT OFFICE 2,390,353

SELF-ALIGNING BEARING ASSEMBLY

Samuel Bousky, Shaker Heights, Ohio, assignor, by mesne assignments, to Jack & Heintz, Inc., Cleveland, Ohio, a corporation of Ohio Application May 19, 1944, Serial No. 536,321

8 Claims. (Cl. 308—189)

This invention relates to improvements in ball bearing assemblies and has as one of its primary objects the provision of a self-adjusting gimbal frame suspension means for a self-aligning ball bearing assembly which will eliminate the necessity for adjustment devices or clearance shims and materially assist in insuring adequate surface contact between the balls and the rotating trunnion it supports so as to properly locate the balls and permit self-aligning of the balls with respect to the ball bearing race.

To this end it is proposed to provide each of the trunnions of the gimbal frame suspension means with a concave bearing surface to engage a relatively large portion of the surface of the ball bearings so as to properly locate the balls. In order, however, for the ball bearing assembly to be self-aligning, the inner surface of the ball bearing race is spherical, being concave with its arc of curvature of considerably greater radius than that of the trunnion so as to permit the balls to hunt their plane of contact. In order to adapt the ball bearing assemblies to be self-adjusting with respect to the trunnions they support and eliminate the necessity of adjustment devices and clearance shims each of the ball bearing races is connected to its support through the medium of a flexible metallic ring formed with spaced circumferential split segments providing limited flexibility in the plane of the axis of the opposed trunnions of each gimbal frame being supported. The tightening of the screw bolts for this purpose places the split ring under compression eliminating the necessity for adjustment shims and at the same time permits a limited degree of flexibility to permit and assist the ball bearings to hunt their proper plane of contact with the race.

Such an assembly has been found to be highly practicable and desirable in connection with the support of gimbal frames for supporting high speed gyroscopic rotors. These rotors set up great forces and stresses which are transmitted to the gimbal frames. In gyroscopic devices the utmost precision is demanded necessitating free turning bearings and even freedom in the gimbal supporting bearings.

With the foregoing and other objects in view, the invention resides in the combination of parts and in the details of construction hereinafter set forth in the following specification and appended claims, certain embodiments thereof being illustrated in the accompanying drawing in which:

Figure 1 is a top plan view of a gyro inner and outer gimbal frames with two sets of trunnions at right angles to each other and their bearing assemblies and supports in section;

Figure 2 is an enlarged detail view in section of a portion of a ball bearing race and a support with an assembly bolt in place but not tightened and showing the split ring not distorted under compression;

Figure 3 is a similar view showing the bolt tightened and the split ring distorted under compression; and Figure 4 is a view in perspective of the split ring in the distorted condition it would assume in Figure 3.

Referring more particularly to the drawing, the gyro rotor may be housed and supported by a casing 1 carrying trunnions 2 and 3 supported for turning in bearing assemblies comprising balls 4 and races 5 carried by a gimbal frame 6. Gimbal frame 6 is also provided with trunnions 7 and 8 that are supported for turning in bearing assemblies, similar to those carried by the rotor casing and including balls 4 as well as ball races 5 secured to a stationary frame 9. The races for supporting trunnions 2 and 3 are adjustably secured by screw bolts 10 to gimbal frame 6 and the races for supporting trunnions 7 and 8 are adjustably secured to stationary frame 9 by screw bolts 11.

Each of the four trunnions 2, 3, 7 and 8 is provided with a concave bearing surface 2', 3', 7', and 8' respectively, to engage the ball bearings 4 in relatively close non-shifting relationship so as to properly locate and maintain the balls in place. The inner bearing surfaces 5' of each of the races 5 for engaging the ball bearings are spherical and while being concave, have an arc of curvature substantially greater than that of the concave outer bearing surfaces of the trunnions, permitting shifting of relationship between the balls and bearing surfaces 5' due to the relatively small area of ball surface engagement. This construction renders each ball bearing assembly self-aligning with respect to the surfaces 5' while the particular relationship between the ball bearings and the trunnions that they support is such as to properly locate and retain the ball bearings in place.

In order to adapt each ball bearing assembly to be self-adjusting with respect to the trunnion it supports, each of the ball bearing races is connected to its support through the medium of a flexible metallic ring which is formed with circumferentially spaced split segments, shown at 12 in Figure 4 in distorted condition with four split segments 13 and bolt holes 14 in each segment. Three or more such segments may be formed in the ring.

For purposes of illustration Figures 2 and 3 represent two stages of assembly of the fastening bolts and split ring 12 in the attachment of the upper outer race 5 to the stationary support 9 for supporting the upper trunnion 7 of the gimbal frame 6 of Figure 1, although it is to be understood that the same type of split ring and the same mode of attachment is used in securing lower race 5 of gimbal frame 6 to the lower stationary frame 9 for gimbal trunnion 8 as well as in the attachment of races 5 to gimbal frame 6 for the support of trunnions 2 and 3 of the gyro casing 1 in gimbal frame 6. The split ring is normally circular and flat and remains so as the bolt 11 is inserted through one of the bolt holes 14 of one of the segments 13 and engages appropriate screw threads in support 9 prior to tightening up of the bolt. Tightening up on the screw head bolt forces the split segment downwardly to distort the ring and at the same time straightens out the split lock washer 15 carried by the bolt so as to assume the position shown in Figure 3.

This method and means of support does away with the necessity of adjustment devices and clearance shims and adapts the race to be self-adjusting with respect to the ball bearings and trunnions by reason of the flexibility of the ring and permits longitudinal movement of the trunnions along their axes with respect to the support within certain limits prescribed by the abutment of the main ring portion 12 with the enlarged head of the screw bolt 11 which overlaps for that purpose. This flexibility of support also assists the ball bearing assembly to be self-aligning as the balls seek their proper plane of engagement with the race to provide proper bearing clearances under varying conditions.

Such a ball bearing construction has been found to be ideally suited for gimbal supports for a high speed gyro rotor where the stresses and forces due to precession are great and where precision of adjustment and operation are critical. For instance, the support renders the ball race self-adjusting and while the unique construction permits a degree of self-alignment between the ball bearings and the ball race there is virtually no shifting of relationship between the ball bearings and the trunnions that they support. Moreover, the inner surfaces 5' of the ball bearing races are made spherical to obtain ease of manufacture in that these surfaces may be lapped by a ball.

I claim.

1. In combination in a gimbal frame suspension having a ball bearing assembly for each of its two pairs of trunnions, said trunnions being provided with spherically concave bearing surfaces adapted to engage and closely approximating the exterior dimensions of said ball bearings, said assembly including a race whose inner bearing surface has an arc of curvature defined by a relatively greater radius than that of said trunnion and engaged by said ball bearings in relatively less surface contact and in self-aligning relationship, and a self-adjusting means for supporting one of each pair of said races including a flexible metal ring with circumferentially spaced split portions to receive fastening bolts to secure the same to a main support.

2. In combination in a gimbal frame suspension having a ball bearing assembly for each of its trunnions, said trunnions being provided with spherically concave bearing surfaces adapted to engage and closely approximating the exterior dimensions of said ball bearings, said assembly including a race whose inner bearing surface has an arc of curvature defined by a relatively greater radius than that of said trunnion and engaged by said ball bearings in relatively less surface contact and in self-aligning relationship, and a self-adjusting means for supporting one of said races including a flexible metal ring with circumferentially spaced split portions to receive fastening bolts to secure the same to a main support and distort the same out of alignment with the remainder of the ring to permit relative linear movement in the plane of the axis of the trunnion to a degree to constitute a self-adjusting assembly.

3. In combination in a gimbal frame suspension having a ball bearing assembly for each of its trunnions, said trunnions being provided with spherically concave bearing surfaces adapted to engage and closely approximating the exterior dimensions of said ball bearings, said assembly including a race whose inner bearing surface has an arc of curvature defined by a relatively greater radius than that of said trunnion and engaged by said ball bearings in relatively less surface contact and in self-aligning relationship, and a self-adjusting means for supporting each of said races including a flexible metal ring with circumferentially spaced split portions to receive fastening bolts to secure the same to a main support and distort the same out of alignment with the remainder of the ring to permit a relative linear movement in the plane of the axis of the trunnion to a degree to constitute a self-adjusting assembly, and means for positively limiting the degree and extent of such relative movement.

4. In combination in a gimbal frame suspension having a ball bearing assembly for each of its two pairs of trunnions, said trunnions being provided with spherically concave bearing surfaces adapted to engage and closely approximating the exterior dimensions of said ball bearings, said assembly including a race whose inner bearing surface has an arc of curvature defined by a relatively greater radius than that of said trunnion and engaged by said ball bearings in relatively less surface contact and in self-aligning relationship, and a self-adjusting means for supporting one of each pair of said races including a flexible metal ring with circumferentially spaced split portions to receive fastening bolts to secure the same to a main support and distort the same out of alignment with the remainder of the ring to permit a relative linear movement in the plane of the axis of the trunnion to a degree to constitute a self-adjusting assembly, and means for positively limiting the degree and extent of such relative movement and comprising an enlarged bolt head overlapping the main portion of said ring to abut the same upon a predetermined movement of the race in one direction.

5. In combination in a gimbal frame suspension having a ball bearing assembly for each of its trunnions, said trunnions being provided with spherically concave bearing surfaces adapted to engage and closely approximating the exterior dimensions of said ball bearings, said assembly including a race whose inner bearing surface has an arc of curvature defined by a relatively greater radius than that of said trunnion and engaged by said ball bearings in relatively less surface contact and in self-aligning relationship, and means for adjusting the bearing clearances between said race and said ball bearings and a self-adjusting means for supporting one of said races including a flexible metal ring with circumferentially spaced split portions to receive fastening bolts to secure the same to a main support.

6. In combination in a gimbal frame suspension having a ball bearing assembly for each of its trunnions, said trunnions being provided with spherically concave bearing surfaces adapted to engage and closely approximating the exterior dimensions of said ball bearings, said assembly including a race whose inner bearing surface has an arc of curvature defined by a relatively greater radius than that of said trunnion and engaged by said ball bearings in relatively less surface contact and in self-aligning relationship, and means for adjusting the bearing clearances between said race and said ball bearings and a self-adjusting means for supporting one of said races including a flexible metal ring with circumferentially spaced split portions to receive fastening bolts to secure the same to a main support and distort the same out of alignment with the remainder of the ring to permit relative linear movement in the plane of the axis of the trunnion to a degree to constitute a self-adjusting assembly.

7. In combination in a gimbal frame suspension having a ball bearing assembly for each of its trunnions, said trunnions being provided with spherically concave bearing surfaces adapted to engage and closely approximating the exterior dimensions of said ball bearings, said assembly including a race whose inner bearing surface has an arc of curvature defined by a relatively greater radius than that of said trunnion and engaged by said ball bearings in relatively less surface contact and in self-aligning relationship, and means for adjusting the bearing clearances between said race and said ball bearings and a self-adjusting means for supporting one of said races including a flexible metal ring with circumferentially spaced split portions to receive fastening bolts to secure the same to a main support and distort the same out of alignment with the remainder of the ring to permit relative linear movement in the plane of the axis of the trunnion to a degree to constitute a self-adjusting assembly and means for positively limiting the degree and extent of such relative movement.

8. In combination in a gimbal frame suspension having a ball bearing assembly for each of its two pairs of trunnions, said trunnions being provided with spherically concave bearing surfaces adapted to engage and closely approximating the exterior dimensions of said ball bearings, said assembly including a race whose inner bearing surface has an arc of curvature defined by a relatively greater radius than that of said trunnion and engaged by said ball bearings in relatively less surface contact and in self-aligning relationship, and means for adjusting the bearing clearances between said race and said ball bearings and a self-adjusting means for supporting one of each pair of said races including a flexible metal ring with circumferentially spaced split portions to receive fastening members to secure the same to a main support and distort the same out of alignment with the remainder of the ring to permit relative linear movement in the plane of the axis of the trunnion to a degree to constitute a self-adjusting assembly and means for positively limiting the degree and extent of such relative movement, and comprising an enlarged fastening member overlapping the main portion of said ring to abut the same upon a predetermined movement of the race in one direction.

SAMUEL BOUSKY.